US006386985B1

(12) United States Patent
Rackham

(10) Patent No.: US 6,386,985 B1
(45) Date of Patent: May 14, 2002

(54) VIRTUAL STAGING APPARATUS AND METHOD

(76) Inventor: Guy Jonathan James Rackham, Rear Cottage, 224 W. 13th St., New York, NY (US) 10011

( * ) Notice: Subject to any disclaimer, the term of this patent is extended or adjusted under 35 U.S.C. 154(b) by 0 days.

(21) Appl. No.: 09/359,796

(22) Filed: Jul. 26, 1999

(51) Int. Cl.[7] .................................................. A63J 1/00
(52) U.S. Cl. ......................................... 472/75; 345/435
(58) Field of Search ............................... 472/75, 57, 76, 472/81, 83, 84; 345/435, 473

(56) References Cited

U.S. PATENT DOCUMENTS

| | | |
|---|---|---|
| 5,528,425 A | 6/1996 | Beaver |
| 5,682,196 A | 10/1997 | Freeman |
| 5,734,794 A | 3/1998 | White |
| 5,765,314 A | 6/1998 | Giglio et al. |
| 5,790,124 A | 8/1998 | Fischer et al. |

*Primary Examiner*—Kien T. Nguyen
(74) *Attorney, Agent, or Firm*—Dorsey & Whitney LLP

(57) ABSTRACT

The present invention is a process of staging a live or pre-recorded performance that follows a schedule, optionally before a mass audience. The performance involves electronic and/or mechanical media that is computer controlled, preferably so as to create a virtual reality of one or more events. In the course of the performance, when an action that is not normal to the schedule occurs, the timing, speed, or sequence of one or more electronic and/or mechanical media activities are adjusted, whereby to compensate for the action so that the action does not adversely affect the continuity and totality of the performance to the audience. The present invention also encompasses an apparatus that comprises a sensory stimuli device(s), a mass audience area substantially within a space for reception of the sensory stimuli device(s), and computer hardware and software. The computer hardware and software comprises a script of a scheduled performance; a control program that steps through the script while allowing for flexibility and adaptation of the performance in response to an action that is not normal to the schedule; and a control interface(s) to the sensory stimuli device(s) whereby sensory stimuli associated with the performance can be commanded by the control program. In addition, the present invention embraces a computer readable medium comprising a script containing a thread(s) of performance activity. A thread typically contains computer implementable instructions to control one or more electronic and/or mechanical media devices involved in a performance.

70 Claims, 6 Drawing Sheets

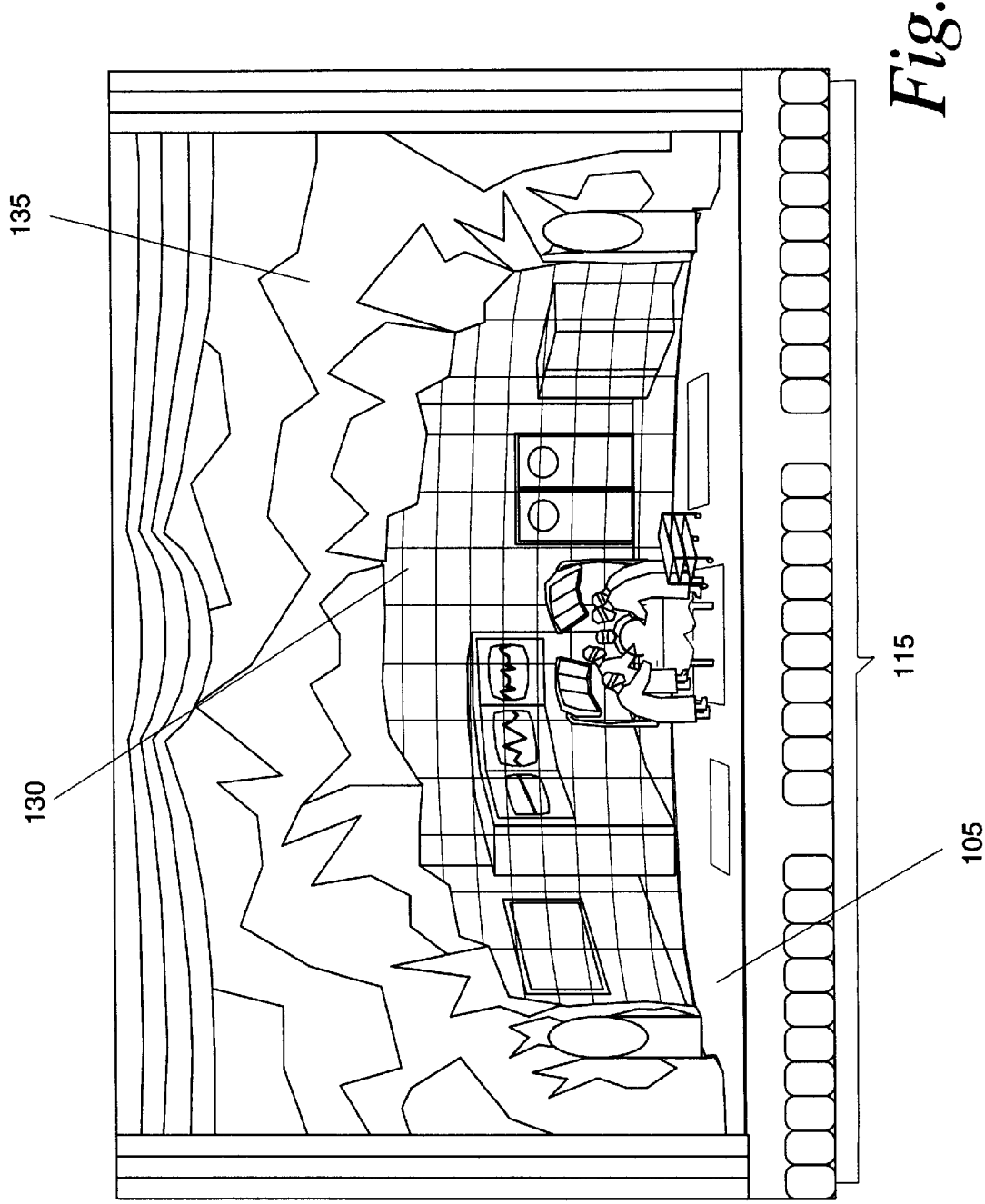

VIRTUAL STAGING APPARATUS AND METHOD

TECHNICAL FIELD

The invention is employed for performances or presentations. More particularly, the invention relates to apparatus and methods for enhancing a performance or presentation with electronic and/or mechanical media.

BACKGROUND ART

The image of live actors interacting with animated or pre-recorded images and sound is commonplace. In film or television, the coordination between the various images and sounds is largely achieved in the editing room, or as the result of repeated rehearsal until the timing of the combined performance is exact. In such cases, the combined image is recorded and, therefore, each viewing is identical. With pre-recorded images, unfortunately, there is no mechanism to adjust the flow of the presentation to allow for variations in the performance or the audience response. All aspects of the performance are predetermined and therefore the presentation is passive to the audience's reaction.

The use of pre-recorded audio and visual material in live performance is also commonplace in theatre, music, and business presentations. Again, however, there are significant limitations with the ability to manipulate the pre-recorded material and electronic media in coordination with the live performance. Visuals effects, sounds and other media can be linked together, but such synchronization capabilities are currently limited and typically include significant manual intervention. For example, a technician may, in response to some aspect of a live performance, manually trigger video, sound and lighting changes together. Once triggered, the various effects typically run for a fixed time. It is therefore necessary for the performers to have rehearsed their timing exactly and for the related media and control signals to have been pre-recorded and matched together exactly. For instance, once an actor has embarked on a dialogue in such circumstances, there is no mechanism to adjust the pace and/or timing of other media employed concurrently in response to variations in the actor's performance or the audience's response. Accordingly, it is believed that the use of pre-recorded media in live performance has been restricted to highly rehearsed and short sequences.

U.S. Pat. No. 5,790,124 (the '124 patent) discloses a system for allowing a live performer to interact with a background display screen that is driven by real-time generated, textured mapped graphics. By tracking the position of the performer, the system of the '124 patent can control and change the production of visual images as the performer moves on the stage to give the illusion to an audience that the performer is moving about a virtual scene. However, the system of the '124 patent is still sensitive to unexpected interruptions, disruptions, and other events that affect the timing of the performance.

SUMMARY OF THE INVENTION

The present invention provides, in one aspect of the present invention, a process of staging a performance that follows a schedule before a mass audience. The performance involves electronic and/or mechanical media that is computer controlled. In the course of the performance, when an action that is not normal to the schedule occurs, the timing of one or more electronic and/or mechanical media activities are adjusted, whereby to compensate for the action. Desirably, the timing adjustment is such that the action that disrupts the normal schedule does not adversely affect the continuity and totality of the performance to the audience.

Another aspect of the present invention is a process of staging a live presentation that follows a schedule. The presentation involves electronic and/or mechanical media that is computer controlled so as to create a virtual reality of one or more events. In the course of the presentation, when an action that is not normal to the schedule occurs, the timing of one or more electronic and/or mechanical media activities are adjusted, whereby to insure the continuity of the presentation. Desirably, the timing adjustment compensates for the non-normal action without adversely affecting the presentation.

The present invention also encompasses an apparatus that comprises a sensory stimuli device(s), a mass audience area substantially within a space for reception of the sensory stimuli device(s), and computer hardware and software. The computer hardware and software comprises a script of a scheduled performance; a control program that steps through the script while allowing for flexibility and adaptation of the performance in response to an action that is not normal to the schedule; and a control interface(s) to the sensory stimuli device(s) whereby sensory stimuli associated with the performance can be commanded by the control program.

In addition, the present invention embraces a computer readable medium comprising a script containing a thread(s) of performance activity. A thread typically contains computer implementable instructions to control one or more electronic and/or mechanical media devices involved in a performance.

BRIEF DESCRIPTION OF DRAWINGS

FIGS. 1b–1d are front views of a portion of the apparatus depicted in FIG. 1a.

DETAILED DESCRIPTION OF A PREFERRED EMBODIMENT

A. Overview

Figure 1A:
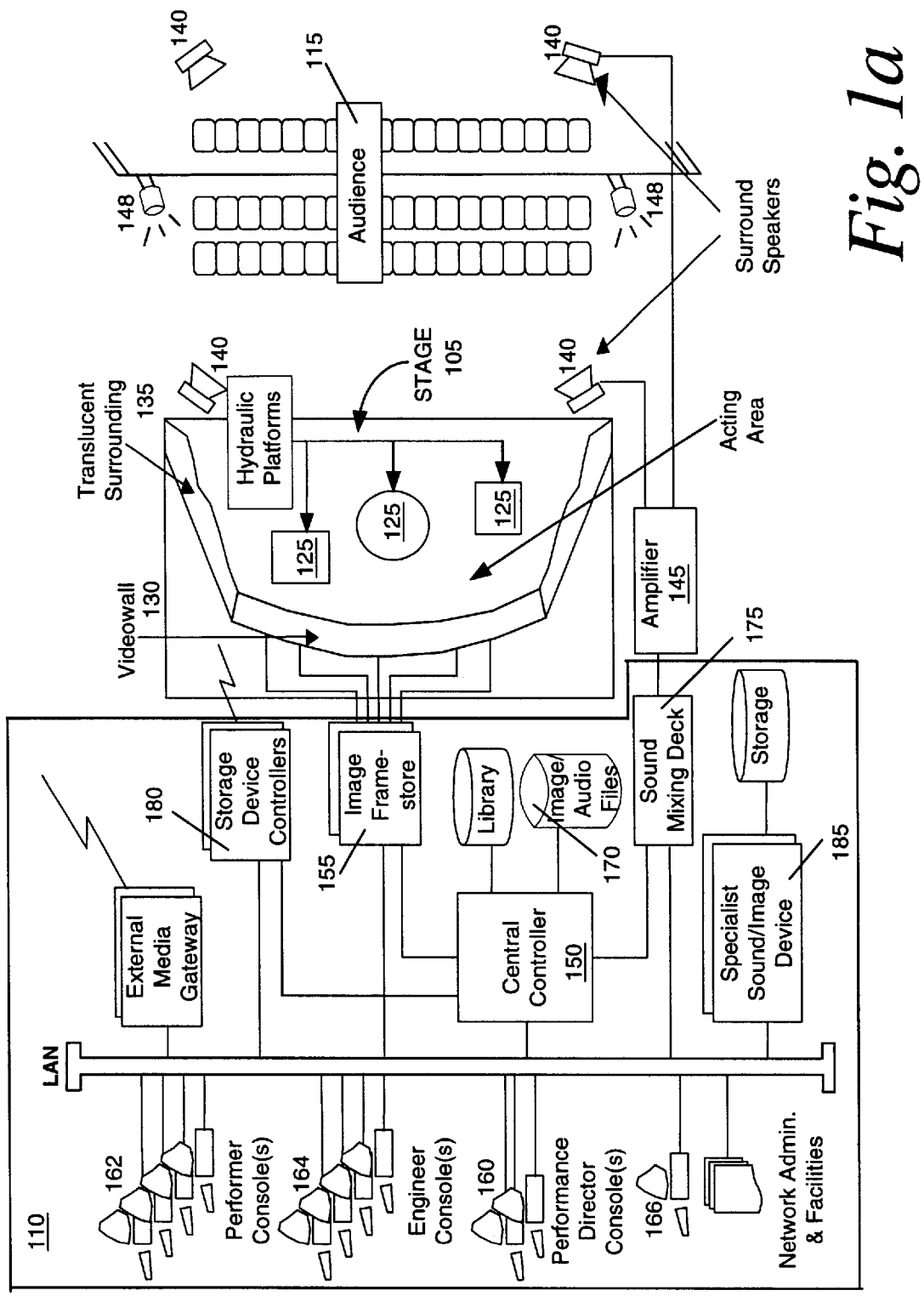
FIG. 1a is a diagram of an apparatus according to a preferred embodiment of the present invention.

Before describing a preferred embodiment with reference to the figures, a brief overview of the invention and its advantages is presented.

The present invention preferably provides for "virtual staging," which, as used herein, involves creating a virtual experience that combines a performance or presentation (both of which are hereinafter in the definition of the term "performance") and various electronic and/or mechanical media to create the visual and/or audio illusion of an event in which a live mass audience (i.e., more than an individual or a small, closely tied group) perceives the sensation of observing or sharing a space with the media and possibly performers. The "space" is the setting, surroundings, environment, or context of the performance and is preferably a simulated three-dimensional space generated by a real-time computer graphics engine. In order to create the desired virtual staging effect, electronic and/or mechanical media are manipulated in close synchronization to the performance and the complex confluence between a performance and multiple electronic and/or mechanical media are managed. Exemplary electronic and/or mechanical media include computer controllable sensory stimuli devices, such as, for example, video surfaces, sound systems, lighting systems, and moveable platforms within a live performing area. In a preferred embodiment, a large projection video surface, driven by a real-time three-dimensional graphics engine, is positioned on a stage behind real performers so as to provide a virtual backdrop set through which the performance may navigate.

The present invention can be used to stage many types of performances, including, for example and not by way of limitation, theatrical performances, concerts, business presentations, and educational presentations. A performance, whether live or a playback of a pre-recorded performance, proceeds to some extent according to a schedule, but the present invention provides the flexibility and responsiveness to gracefully handle [unscheduled actions, which may] actions not normal to the schedule. Such non-normal actions include, for example, unscheduled actions, the inevitable and unpredictable variations or disruptions in a performance itself [as well as], the inevitable and unpredictable variations in audience reaction [or other externalities], or external disruptions (and/or variations in the duration of the foregoing). The present invention is capable of compensating for [unscheduled] non-normal actions by manipulating the speed, sequence and/or other timing aspects of multiple media.

A computer system according to the present invention comprises a script of a performance, a control program, and one or more controls connected to devices whereby sensory stimuli associated with the performance can be commanded. The script is a technical narrative of the events and activities that make up the performance, including interdependencies between different events and activities. The script may be organized as several simultaneous threads wherein each thread is one particular sequence of events. Exemplary threads are performer dialogues, musical scores, sound effects, lighting changes, platform motions, video excerpts and combinations of the foregoing. The control program executes or "steps through" the script by interpreting each elemental event in a sequence, effecting and/or awaiting its occurrence, and managing interdependencies where necessary, including inherently unpredictable interdependencies arising from audience reaction or performer/presenter variation. The control program utilizes a timing framework to provide for synchronization and speed variations. The computer system of the present invention may also provide interfaces connected to the script and/or the control program whereby a performance director and/or the audience can influence the performance, such as, by adjusting the timing of events and choosing storylines.

As contrasted with conventional technology, the present invention offers several significant advantages in terms of the end product performance. Most notably, highly sophisticated combinations of real-life performance, staging effects, sound and visual effects that have been possible only using editing techniques can now be performed live with the present invention. Although some of these effects technically could be performed without the invention described herein, the practical limitations are severe and preclude all but simple combinations. Furthermore, virtual staging offers other significant improvements to the quality of the theatrical performance, including: (1) improved synchronization of effects from many disparate technologies; and (2) realistic navigation through three-dimensional scenes.

From a productions point of view, the present invention offers advantages in terms of centralization, repeatability, scalability, and portability. First, aspects of the performance, such as music score, dialogue script, acting prompts, staging and lighting directions, and even control signals to hydraulic staging devices, can be displayed and/or scheduled in close synchronization with each other using a central facility. Second, once a virtual staging script has been defined, device control signals and the recorded media created and stored on the computer, the performance can be repeated with ease. Third, the performance is scalable. For example, the video and sound signals can readily be scaled to different stage and auditorium configurations. If automated lighting rigs are not available, then these control signals can be used instead to generate manual cues for lighting engineers. The musical score can be replaced with pre-recorded music if live musicians are not available. In addition, the virtual staging software can be designed to accept dimensional information about the auditorium and make necessary adjustments to the sound, video and lighting controls automatically, in effect auto-configuring the virtual stage for the location. Fourth, the performance is portable, because a virtual stage does not require the complex mechanics of a traditional theatrical set with wings and flys and physical scenery. Instead, material can be stored and copied to new locations quickly, where a standard rig of sound, projection, lighting and stage equipment has been set up. Also the stage itself can be portable, allowing for performances on the road. The scalability and portability of the present invention make it possible to use the present invention in a more limited environment, such as a home or school, for example.

The underlying technology of virtual staging provides a number of related benefits which include: (1) the ability to create a library of static and moving scenes/backdrops, which may include detailed lighting directions and sounds effects, such that new scenery can be quickly generated and past investments re-used; (2) easy integration of other technologies, such as, for example, real-time puppetry where an operator manipulates a suit or other device and a computer generates a moving cartoon character, especially when open systems standards are utilized; (3) improved stage/audience area ratio, because extensive wing space and space above the stage are not required, all sets being mostly electronically generated and stored, making it possible to utilize virtual staging in a more regular shaped cinema space; (4) the physical volume of the staging equipment may be significantly less than traditional staging structures, making a virtual staging based performance easier to transport between locations (and as noted above, less demanding of space requirements); (5) enhanced safety, as there are minimal moving parts to the set; (6) change to any aspect of the performance can be more easily implemented and documentation more readily maintained, because of computerization; and (7) the technology behind virtual staging can be utilized to support other activities (e.g., business presentations, video games, karaoke, or karaoke theater) that exploit the same location and the overall space could be quickly reverted to cinema use. For example, the present invention could be utilized as a "karaoke theater," where monitors are provided to display cues and lines for participants, while the system generates projected scenery, music and sounds as necessary to complete the performance. Additional advantages of virtual staging are readily apparent from the detailed description below.

B. Physical Components

Figure 1B:
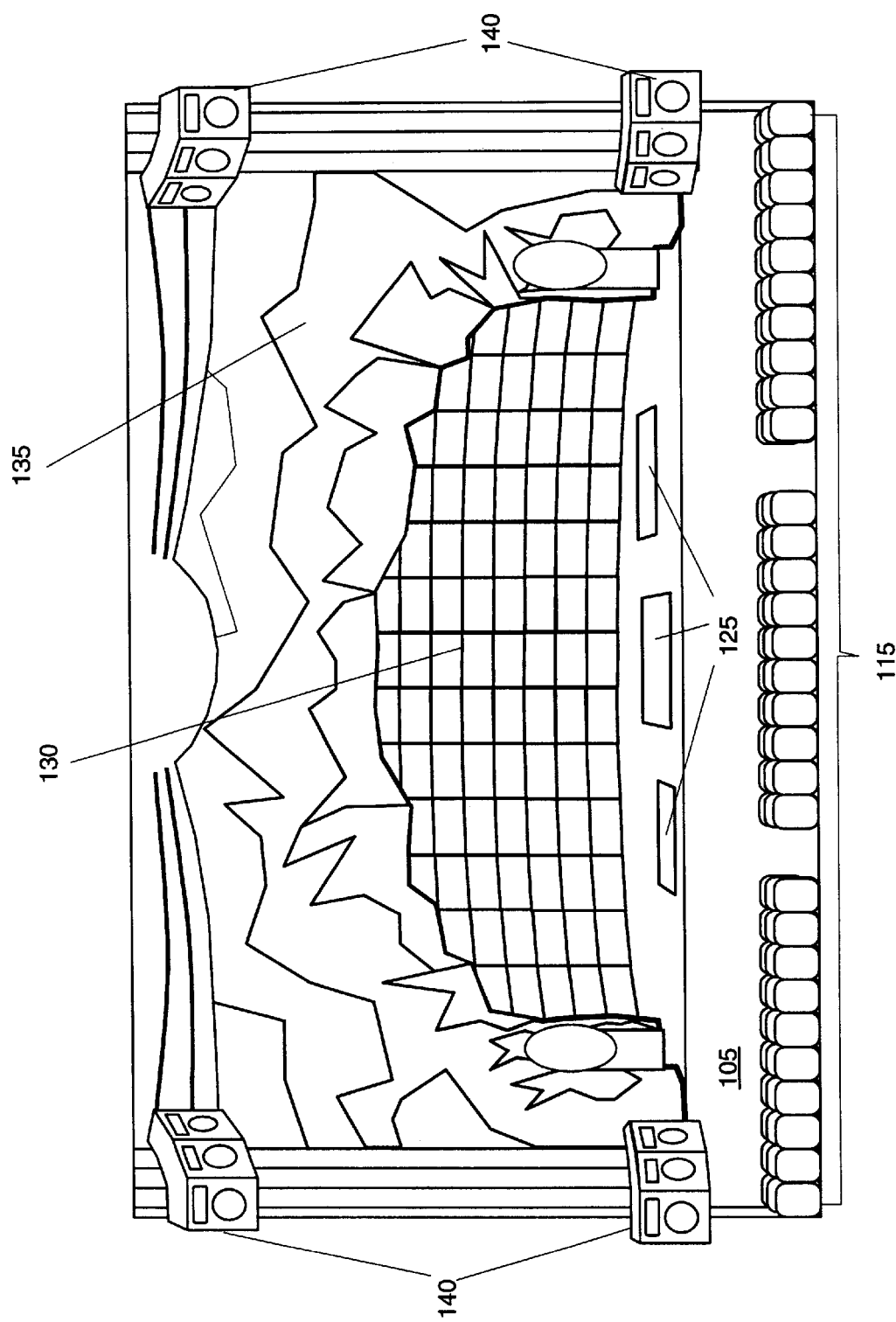
Figure 1D:
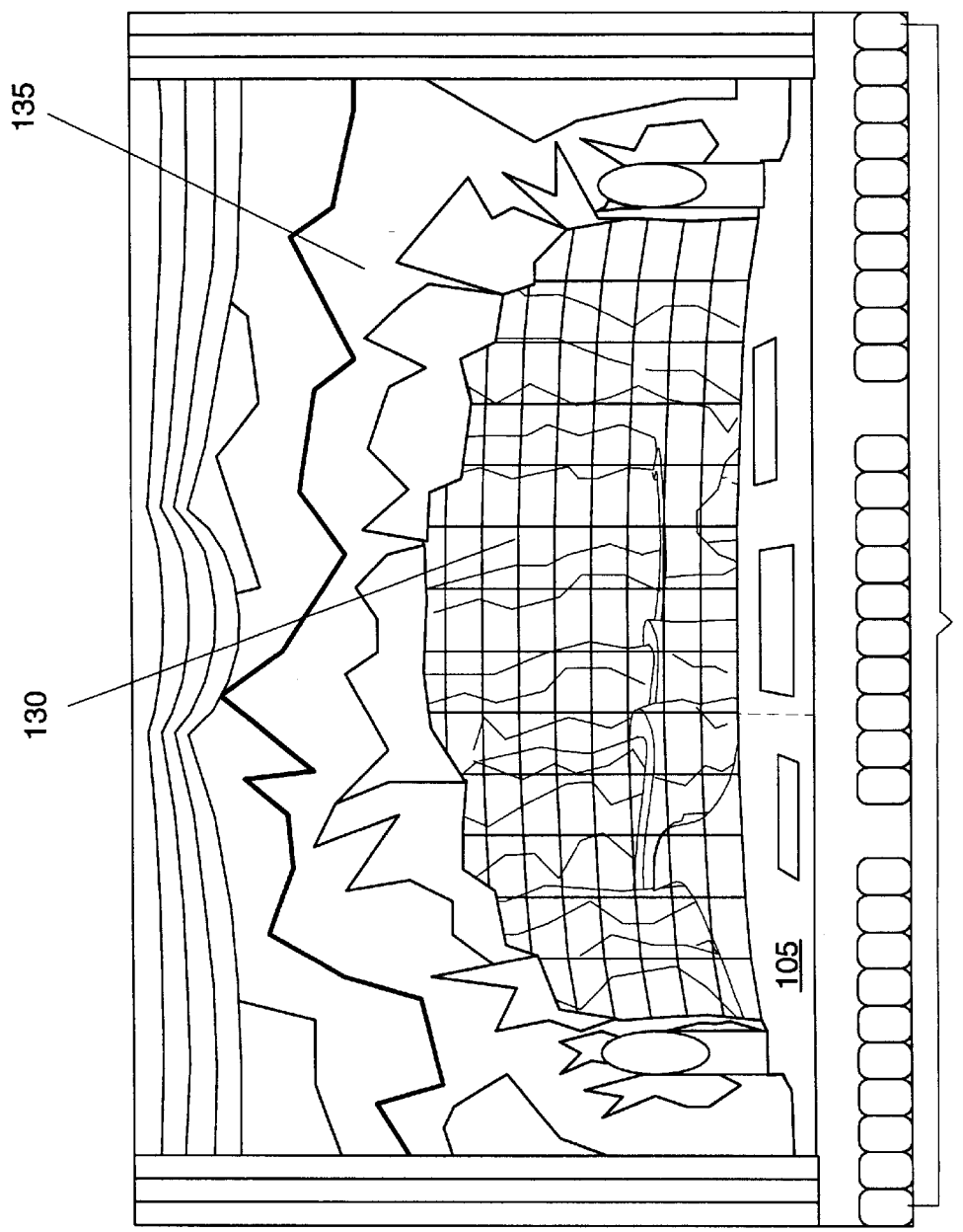

FIG. 1a is a diagram of a preferred apparatus 100 according to the present invention. The primary components of the apparatus 100 are a stage 105 and a computer system 110. FIG. 1b shows a front perspective of the stage 105 bare. FIGS. 1c and 1d show a front perspective of the stage 105 in use. Positioned to the front side of the stage 105 may be an audience area 115. The stage 105 comprises an performing area 120, which includes several hydraulic platforms 125. Behind the performing area 120 is a video surface 130, which is flanked on the sides by a translucent surrounding 135. The apparatus 100 also includes a sound system, including speakers 140 and an amplifier 145, and a lighting system, including lights 148. The components of the apparatus 100 are described in greater detail below.

The performing area 120 is made up of one or more generally horizontal surfaces, some or all of which maybe moveable, such as the moveable platforms 125. The computer system 110 generates control outputs to mechanical devices that move the platforms 125 in synchronization with other media to create the combined effect of a virtual stage. The platforms 125 may be equipped to move laterally, move vertically and/or rotate. These movements can be synchronized with the perceived angle of observation of projected images on the video surface 130, directional sound effects, adjustments to physical lighting and other media.

The video surface 130 is preferably a large projection surface. The image is preferably generated using rear projection technology to avoid actors and physical objects casting shadows on the surface. Suitable mechanisms are video wall technologies and computerized image rear projectors. The video surface 130 may be curved in the horizontal and vertical planes (most likely a shallow parabolic curvature) to enhance viewing from seating positions not directly in front of the stage 105. The performing area 120 may also be domed, sloped or curved to better accommodate more elevated audience positions and/or to mask the distortions of perspective arising from the two dimensional projections, the performance area 120 may be irregular or curved. The floor of the performance area 120 and the platforms 125 also may be transparent, or thin in construction such that the audience can see through to any video surface below when in an elevated position. Furthermore the video surface 130 itself need not be rectangular in overall shape, nor limited to being an individual surface, depending on the staging effect required.

It may be desirable to utilize a mounting framework for the video surface 130 to support the weight of the individual projection devices and allow movements of the video surface 130 during the performance (e.g., to change the configuration of the video surface 130). A mounting framework preferably allows for quick replacement of individual projection devices that might become defective.

The gap between the outside edge of the video surface 130 and the boundaries of the staging area may be filled with a textured, translucent or semi-translucent surface 135. This can be illuminated with sympathetic lighting colors to visually smooth the edge of the video surface 130 and complete the overall visual effect. Multiple diffuse RGB rear projection devices, or some equivalent means, can then be used, under the control of the computer system 110, to illuminate the surface 135 with colors that match the corresponding adjacent edge portion of the projected video image. The effect is to soften the visual boundary of the projected image on the video surface 130, which might otherwise be a distraction to the audience and degrade the virtual staging effect.

To ensure that action on the performing area 120 is merged with the projected image, a number of devices may be employed. First, lighting from above, below and/or the side of the performing area 120 can be used to balance the relative intensity of the projected image and the physical objects and actors on the stage. This lighting is preferably positioned such that it does not interfere with the projected image, as explained in greater detail below. Second, fluorescent make-up and/or paint, combined with ultraviolet (UV) lighting can be used to increase the visual intensity of actors and physical objects. In this regard, note that some objects may be implemented as a combination of physical objects and projected image. For example, a chair could have a real bottom seat area and a projected back. Third, the platforms 125 can be moved so that the actual and apparent movements of physical objects on the stage surface and the projected image respectively are closely synchronized. For example, an actor may be raised from below the stage as the projected image itself is scrolled up, giving the audience the impression that they are, correspondingly, being lowered into the scene.

The apparatus 100 preferably includes a three dimensional wrap-around directional sound system to permit movements on the projected image to be synchronized with the apparent position of the source of a sound. Directional sound can be accomplished by adjusting relative volumes and possibly introducing slight delays in broadcasting any particular sound effect from speakers 140 positioned around the auditorium to give the impression of sound sources being in or moving through any position surrounding the audience, in coordination with projected images. For example, a passing car may start as a sound located behind the audience area 115, move through the audience area 115 and apparently into the distance in coordination with the visual image of a car coming into view in front of the audience area 115 and driving off, as if through the back wall of the stage. In a typical configuration, sound effects would be held in a pre-recorded format, such as MIDI control files, on the computer system 110 and referenced by a virtual staging script. The directional effect of the sound can be achieved by adjusting the relative volumes and sound mixes between the speakers 140 positioned surrounding the audience. Audio outputs can be individual feeds to each speaker, such that the computer system 110 determines the relative volumes needed to establish the observed direction and movement of a sound source. Alternatively, a single sound output and control signal can be generated and fed to a specialist broadcast device. In such a configuration, the specialist broadcast device would be capable of adjusting the relative volumes to the array of speakers 140 based on the directional parameters that would be passed to it from the computer system 110. Alternatively, sound delivery may be by means of headphones provided at each seat of the audience area 115.

A physical lighting system, including for example the spotlights 148, is used to balance the visual intensity between performers on the performing area 120 and images projected behind them. Some parts of physical acting props or the acting surface itself may often need to be cast in shadow to sustain the virtual staging effect. For example, if a motorbike facing the audience is used as a prop, with the projected image and spatial sound being used to create effect of driving along a street, the lower half of the bike might be in shadow and the rider be more intensely illuminated. This lighting arrangement would encourage the observer to match up the actor with the sound and moving image, while ignoring the static surface below. Additional physical lighting effects can coordinate the generation of light and shadow in the computer generated projected image with the incidence of physical lighting. As with all activities, this more elaborate confluence of media is accomplished by the computer system 110 and referenced by the virtual staging script.

The description above covers the four main components of the virtual stage, namely (1) the projected images, (2) the directional sound, (3) the moveable performance surfaces and (4) physical lighting controls. However, the present invention is capable of managing other devices and media in addition to these, as might be required to enhance the virtual stage for a specific performance. This could include pyrotechnics, flying wire mounted objects, scanning lasers projected over the audience, additional projection surfaces positioned around the auditorium, low frequency sound systems to enhance the sense of movement (e.g. Sensurround (TM)), wind generators, smoke emitters, mist emitters, odor generators, and seat motion devices. Devices such as wind generators (e.g. fans), smoke emitters, mist emitters, odor generators, and seat motion devices may be provided from one or a few global sources or may be provided discretely at each seat in the audience area 115. Furthermore, it is even possible to replace the video surface 130 and the sound system, including the speakers 140 and the amplifier 145, all of which are global scale sensory stimuli devices, with individualized sensory stimuli devices, such as virtual reality goggles and headphones, respectively.

The complete effect of a virtual staging experience is observable by the audience within an "observation cone." The observation cone is a three dimensional space emanating out from the stage 105 and defined to be the space within which all the media and observed actions combine within allowed tolerances to sustain the impression of the virtual stage. Members of the audience positioned within the observation cone will all observe slightly different images of the virtual stage due to their different relative positions, but the combined effect of the virtual stage will be consistent. For example, as an actor stands in front of a projected three dimensional image of a wood, a member of the audience seated to one side of the observation cone will perceive that the actor is standing in a different relative position to the trees in the wood, as compared to a member of the audience seated on the opposite side. Nonetheless, both will see an actor standing in a wood. If the platform 125 of the performing area 120 is rotated in synchronization with the observed perspective of the projected image of the wood, both members of the audience will experience the effect that they are rotating their position around the actor, as a cameraman might when making a film.

With two dimensional visual projections of three dimensional views, there is a limit to the angle of observation for which the illusion of changing perspectives can be sustained. This limitation defines the observation cone in virtual staging. Outside this angle, the variations in perspective become too great for the observer to perceive the effect, as the individual components become distinguishable. The observation cone is also limited by the projected image, as described above; the directional capabilities of sound in the auditorium (although the observed direction of a sound effect is far less precise for members of the audience); and the physical lighting system.

C. Human Components and Interfaces

The three primary human components associated with the virtual staging apparatus 100 are performers, the audience, and a performance conductor. These people and their interfaces to the virtual staging apparatus 100 are next described.

The performers act out their roles on the performing area 120. They are not restricted to this area other than as necessary to sustain the virtual staging effect. An actor may move into the audience area 115 for dramatic effect, for example, at which time the virtual staging effect becomes secondary to the performance. The performers may respond to sound and visual cues or provide cues to the performance conductor to trigger the next sequence of actions set out in the virtual staging script. It is possible that a performer may be provided with a hand held device on stage to be able to undertake the performance conductor role for part or all of the performance. It is also possible to include movement sensors and/or position indicators attached to the performers or the performing area 120 to generate prompts or inputs to the computer system 110 or other devices to trigger responses that further enhance the overall virtual staging effect. Performers are not required, however. The virtual staging experience can be accomplished entirely on the basis of electronic and/or mechanical media.

The audience area 115 is preferably positioned within the observation cone, as described above. The audience perceives the virtual staging experience and reacts to it. In the simplest form, the audience's influence over the performance is limited to the variable time taken to react to the presentation (e.g. applause or laughter). In a more sophisticated implementation, the audience can influence the direction of the performance itself, collectively instructing the performers, performance director or the computer system 110 to take one or another path through the virtual staging script. One mechanism for collecting input from the audience is input devices, such as voting buttons, provided on the audience's seats.

The performance director/conductor is a role that can be taken by an individual or shared between several people. A performance conductor may or may not be a performer. The performance conductor observes the performance and interfaces with the computer system 110 to control and manage the progress through the virtual staging script, responding to the variations of timing in performance and/or audience response. The performance may be presented as a single story line, a story line with many allowed paths, or even a number of building blocks that can be combined together in different sequences for each individual performance. The performance conductor is provided with the necessary controls to adjust the sequence of activities where there are allowed changes in the story line. The audience may assume part or all of the performance director's role. In some cases the performance conductor may be absent or optional. In such cases, the script is completely predetermined, and the computer system 110 itself schedules all events, cueing performers and devices as necessary to run through the script in an automated fashion without human intervention or perhaps with only minimal human oversight.

In addition to the three primary human components just described, other human components are possible, including musicians, engineers, and others. For example, for full flexibility, accompanying music is ideally performed live. In this configuration, the computer system 110 stores a musical score and presents it at the appropriate time on one or more display consoles visible to the musicians. In addition to the musical score, the displays can provide cue and beat information to enable the musicians to synchronize to the overall virtual performance D. Computer Hardware The computer system 110 produces the virtual staging experience by controlling physical components and interfacing with human components. In the preferred embodiment of FIG. 1, the computer system 110 comprises a local area network (LAN) that links a central controller 150 to various devices, files, and consoles, such as an image processor/framestore 155, performance director console(s) 160, performer console(s) 162, engineer console(s) 164, other console(s) 166, image/audio files 170, sound mixing deck 175, stage device controllers 180, and specialist equipment, such as specialist sound/image device 185. One skilled in the art will realize that other connection networks besides a LAN are equally feasible.

Virtual staging software, as described in the next section, can be made to run on any hardware platform with adequate capacity and capability to support the real-time generation of video images, sound and device control signals. The computer system 110 preferably has recovery and back-up capabilities as well as configured redundancy to protect against single and multiple failures of major technical components. The configuration is preferably "open" to allow for the integration of additional LAN based servers and facilities that might be required (e.g., back-up/recovery devices, print servers, or even devices to support unrelated uses.)

The computer system 110 includes an image processor/framestore 155 so that a single projected image can be routed to the video projection screen 130. In the case of video wall technology, one or more video image framestores 155 split the overall image between the individual projection devices as desired. For rear projection devices, the video image framestore 155 is a projector control unit that synchronizes the displays where more than one projector is used. As most commercial framestores are designed for rectangular projection surfaces, it may is be desirable to "square off" irregular shapes with dummy screens (i.e. stubbing devices that will absorb and suppress the video signal for the corner areas where no actual projection device is needed, while allowing the framestore to function normally).

The computer system 110 is capable of receiving (via the LAN or other communications facility) and merging additional video signals with its internally generated images, if desired. Such an interface can be used to incorporate real-time interactive cartoon characters, for example to permit an electronic puppeteer to manage the projected image of a computer generated character on a stand-alone device and output the image via the central controller 150. Alternately, an interface may be supported by routing directly to the projection controller or framestore 155.

The sequence of projected images, sound and stage movements are managed using the central controller 150, which permits the performance director(s) to manage the scheduling and sequencing of activity, coordinating with the actors, musicians (if live music is being used), lighting and staging engineers, etc. The main output from the central controller 150 is one or more real-time video/image feeds, as required by the image processor/framestore(s) 155, and sound signals. Additional outputs from the central controller 150 may be electronic messages to device controllers (e.g., sound effect facilities, pre-recorded sound devices, lighting controllers, stage hydraulic devices). In addition, the system can support user configurable monitor consoles 160, 162, 164 and 166, which the performance director(s), actors, musicians, lighting and staging engineers and others can observe to coordinate their aspects of the performance.

E. Software Design

Figure 2:
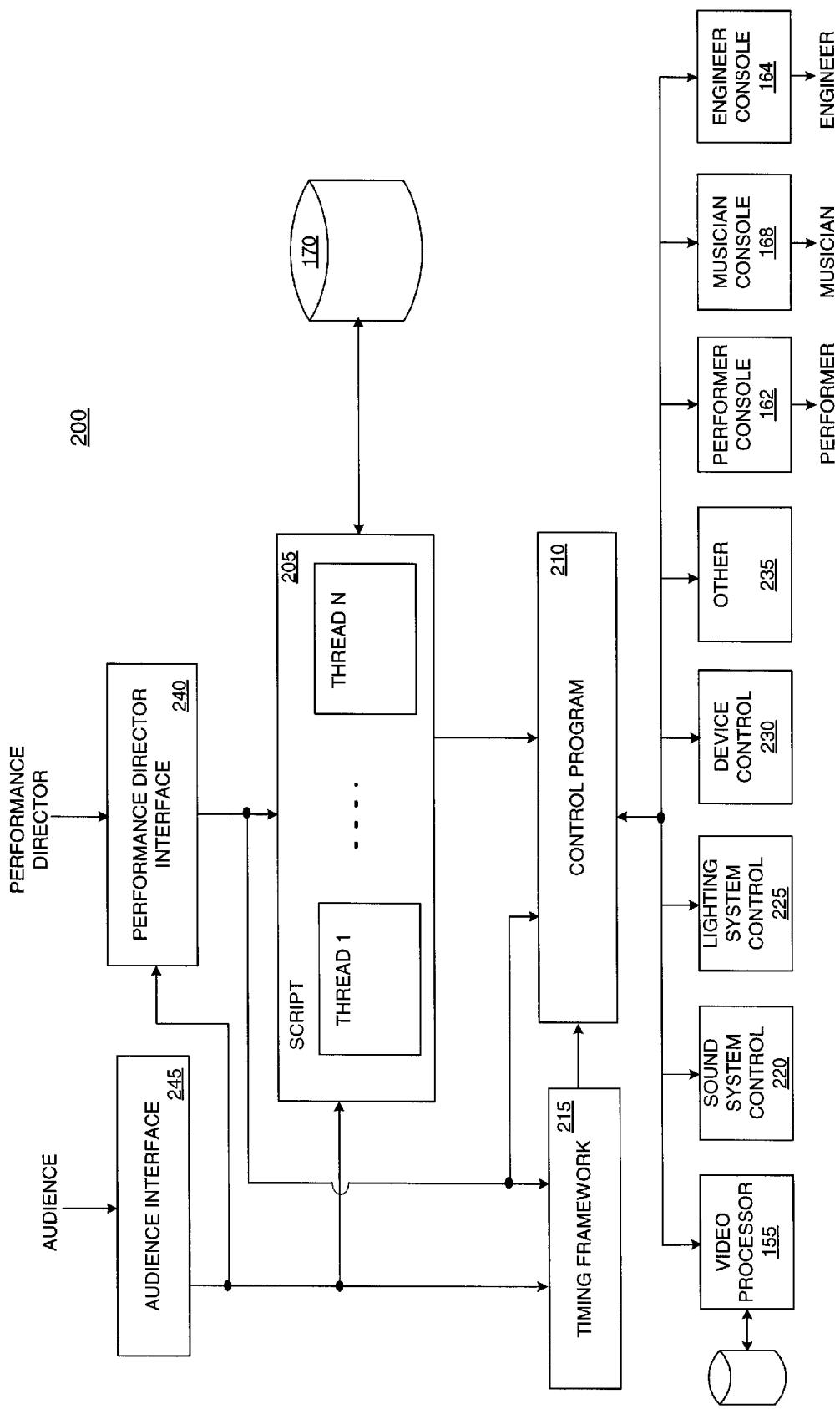
FIG. 2 is a block diagram of virtual staging software system objects and modules according to a preferred embodiment of the present invention.

FIG. 2 is a block diagram of a virtual staging software system 200 that executes on the computer system 110. At the heart of the software system is a script 205, a control program 210, and a timing framework 215. The script 205 lays out the schedule of events, as described below. The control program 210 executes the script 205 by interfacing to various device/system controls, as well as user consoles. Specifically, FIG. 2 illustrates video processor 155, sound system control 220, lighting system control 225 and various consoles 162–168 interfaced to the control program 210. The various device/system control interfaces as well as user consoles 155, 220–235, and 162–268 are utilized to augment a live performance by providing sensual stimuli to the audience directly or indirectly. Other important components of the virtual staging software system 200 are the database 170, and interfaces 240, 245 to the performance director and audience respectively. The performance director interface 240 and the audience interface 245 are connected to each other, the script 205, and the timing framework 215. Although objects and modules in FIG. 2 are conventionally implemented in software, one skilled in the art would realize that implementations in hardware, firmware, and combinations of hardware, firmware and software are equally feasible.

The objects and modules in FIG. 2 (e.g., the script 205 and the database 170) may be embodied on any computer readable medium, including storage devices and signals, whether modulated using a carrier or not, that the computer system 110 can be configured to access. Typical computer readable storage devices include conventional computer system RAM (random access memory), ROM (read only memory), EPROM (erasable, programmable ROM), EEPROM (electrically erasable, programmable ROM), and magnetic or optical disks or tapes. Such computer readable storage devices may be removable or permanently attached to the computer system 110. Exemplary computer readable signals include signals downloaded through the Internet or other modem connected data source.

To the extent possible, it is desirable that the objects and modules of the virtual staging computer system 200 conform to accepted or standardized formats and protocols. For instance, computer images and sound items stored on the database 170 preferably use industry standard file formats. Object oriented (OO) analysis and design methods are the most suitable for a custom software development of the overall system control facilities, as each segment of sound, image, musical score or any other item of the performance is best treated as an instance of a generic OO class. Suitable development languages for the control program include JAVA or C++, or some combination of the two. Any custom software preferably should conform closely to emerging OO and Open Systems standards to ensure easy integration with commercial software and hardware. For example, the drawing environment, music scoring, digital image file management and device drivers are preferably integrated commercial products. Commercial product software development, release control and production management standards are preferably enforced for all custom software implementations.

In a preferred embodiment, the virtual staging software system 200 represents a performance as the script 205. The script 205 is the technical narrative of the show/presentation and enables the performance director to track the position in the performance and manually trigger events. The script 205 may contain a number of threads 1 . . . N of activity that are executed alongside each other and which may have complicated interdependencies. For example, a set of threads may include the musical score for an instrument, the spoken lines for a character, the sequence of set images for the video surface 130, lighting instructions, or a series of sound effects. Tight coordination between different threads is desirable, e.g., it is better if all the musicians play in time and the actors speak their lines in the intended sequence. The script 205 may comprise event sequences that are predetermined, assembled on the fly slightly in advance of their execution, or as is most likely, some combination of the two.

The script 205 is executed by the control program 210 using the timing framework 215 and associated controls under the direction and/or oversight of the performance director. The script preferably records the links between threads of activity that need to be coordinated, and the performance director uses a suite of controls to manage the exact timing and rate of execution of the script to match variations in the live performance. The execution of the performance is in two distinct modes. One mode is event driven progress in which the performance moves forward as the performance director checks off each event as it is completed, or as the control program 210 receives electronic notification of completion from a device controller or equivalent. A second mode of operation is a time based or automated sequencing, where scheduled events are displayed and/or triggered (where automated device drivers are implemented) in real-time. For example, when in this second mode, the music score and staging instructions would scroll automatically. The performance director has comprehensive controls to oversee the performance including the capability to start, stop, jump forward and backward, speed-up and slow-down the rate of progress in this second, automated mode of operation.

The timing framework 215 may comprise a clock to provide a "heartbeat" for stepping through the script 205. All threads may execute according to the same heartbeat clock, or separate heartbeat clocks may be provided for separate threads. As just mentioned, the performance director has the ability to accelerate or decelerate the heartbeat, skip a given number of beats, reset the beat count and perform various other timing modifications to the timing framework 215. The timing framework 215 may also provide timers to, for example, trigger event execution after a fixed delay or extend a condition for a given time.

The script 205 may reference items stored in the database 170. Given the multimedia nature of the items held, an object database or equivalent is best suited for the implementation. The organization of the database 170 is designed to support the quick identification and retrieval of items. A useful aspect of the database organization is item categorization and index structures.

In addition, the database 170 can store a library of items from which new sets can be rapidly assembled, support full inventory management and support for other activities such as development, testing and release control. The database 170 can also store references to items that may be located in remote data-stores or networks, including the Internet, such that images and sounds from other sources can be worked into the overall presentation. Typical items stored in the database 170 include video images, audio signals, staging instructions, dialogue script instructions, and music scores, as more fully described in the following paragraphs.

Full video images (or partial if supported by the projection devices) are routed to the video surface 130 via, for example, a projection device. The images may be (1) prerecorded video clips or (2) computer generated images, such as images created by a real-time three-dimensional graphics engine.

In the former case, the video image items preferably have associated parameters appropriate for its format, including duration for finite length sequences, repeat cycle time for video loops, display rate control information where the sequence can be run at variable speed (for example as might be required to coordinate with some physical staging device). In addition, image size and location parameters may be included. The performance director, or possibly a dedicated video manager will use the computer system 110 to sequence the video signals, i.e. initiating the next video sequence, terminating a video loop or changing the static image displayed.

In the latter case, video image will be generated in the central controller 150 (or linked peripheral devices) from a stored three dimensional space. A good example of this method of image creation is used in video games, where the user navigates the stored three dimensional space using the game controller and the program derives a moving screen image that mimics the movement. For this format of image, an additional facility can be supported where the performance director or video manager has the ability to manipulate the space represented by the projected image on the stage, using some convenient peripheral control device, as in a video game. The main function of the video manager, however, is to use the system to coordinate the video display with the acting, triggering screen images and sounds in synchronization with movements on stage. This is referred to as "dynamic actor interaction," where real movements are enhanced or embellished with moving images and sound. This combination of reality and imagery is used to create powerful visual effects.

Audio signals and sound effects are managed in a manner similar to the video signals. Where appropriate, sound effects will be combined with video images to simplify the control. The video storage format ideally allows for recording the audio signal with the image, eliminating the need for a separate sound-signal management facility for many sound effects. For example, MPEG (moving picture experts group) video compression standards, or a three-dimensional extension, allow for recording accompanying audio signals.

Lighting instructions, stage movements and sound instructions also may be recorded in the database 170 in this manner and referenced by the script 205. Preferably the virtual staging software 200 integrates a standard word processing product for the generation of these items.

If live music is performed and needs to be coordinated with events in a performance, then instrument scores can be held in the database 170 and displayed in a format linked with staging events and triggers so that the musicians can match their timing to the performance. Similarly, where the music needs to be coordinated with staging events, the performance director can ensure that rate of progress is matched to the speed with which the music is being played (using the timing framework 215 controls listed above) to ensure actions are cued on time.

The users of the computer system 110 include three main types: performance director(s), performers and musicians, and engineers. The use of the virtual staging software system 200 from the perspectives of these three types of users is now described.

The performance director(s) uses one or more monitors to track all streams of activity. The performance director is able to dynamically configure what is displayed on the performer and engineer's console monitors (see below); check off events, preferably with a simple mouse instruction; and, when in an automated mode, manage the rate of progress.

The primary task of the performance director, or an additional video manager for more complex work, is to trigger the displays in synchronization with the stage acting. The system will provide the ability to see and possibly adjust future scheduled images on a local screen before they are committed to the main display(s). Where the projected image is derived from a three dimensional space maintained in the central controller 150 (or linked system), the performance director (or video manager) will also be able to manipulate the apparent position and movement through the three dimensional space (as perceived by the audience) using a suitable control.

Monitor consoles can display a music score, dialogue script and staging descriptions in a user configurable form for musicians and performers. The display indicates the estimated point at which the overall performance has reached. In an event mode, the display moves forward as the event director checks items off. In an automatic mode, the display scrolls forward at a rate managed by the performance director. Information can scroll horizontally or vertically depending on the most convenient representation (i.e. music score may scroll horizontally and dialogue script vertically, in different screen windows). Each user has the ability to move forward and backward in the schedule ("look ahead"), and revert to the current position independently of all other users.

Monitor consoles 164 for sound, light and stage engineers are used similarly to those for performers, but display a different profile of information suited to a specific engineer's requirements, e.g. lighting instructions along side dialogue script. Automatically triggered events can be highlighted on the monitors, e.g. the timing of an automated pyrotechnic would be clearly displayed. The user preferably has an override capability for certain automated events for safety purposes. Such a feature could be implemented as part of a configurable user profile.

The software system 200 supports online and offline facilities under configurable user profiles. The online facilities will first be described. Display configuration (i.e., select items and presentation formats for the console monitor) is preferably supported online. Performance schedule amendments and modifications, supported by a suite of online editing facilities, are supported online. In an event driven mode, supported scheduling operations include moving the "current position" forward one step, backward one step, jumping forward, jumping backward, repeating one or more events, awaiting external trigger. In an automated mode, supported scheduling operations include speeding up the rate of progress, slowing down the rate of progress, starting from a position in the schedule, stopping at a position in the schedule, looping from one position to another, and skipping over a portion of the schedule. Another online facility is moving the displayed portion of the schedule forward or backward (without changing the "current position" setting) to look ahead to what is coming. Other important online facilities are manually overriding an automated event (e.g. suppress a signal to a staging device such as a pyrotechnic); manually overriding an interrelated dependency; and broadcasting a message or sending a message to a specific user.

Various facilities are also provided offline. First, setting up default user profiles (e.g., monitor layout and permitted functions) is preferably an offline facility. Other offline facilities are storing and labeling a performance item in the database; defining a performance schedule (sequence and timing of items) using editing utilities; recording different item types in suitable formats (e.g. score and dialogue script), including the links between them, in a meaningful manner (e.g. a lighting change during a song); creating dependencies (e.g., one event may be defined to wait on the completion of another, or automatically trigger another) where the central unit has an automated interface to the device that executes the item, such as a sound card, which could notify the central unit when it has completed playing a sound item. Another offline facility is launching an item creation program, especially if the primary virtual staging software 200 will not itself support the creation of items other than the performance schedule itself. Preferably, items such as a dialogue script and staging instructions can be created using simple word processing utilities. Also, for example, video and audio items can be created using commercial products that can either interface directly with the database 170 (e.g. a scanner writing a fixed image to a predetermined file space) or which can run on the central controller 150 or a specialist server on the LAN. These programs can be called from the central program as utilities during the development of items (e.g. the drawing of a new image) or during the performance (e.g. to integrate a sound effect device). Finally, system controls and administrative facilities are preferably provided off-line through a separate series of screen based facilities on an operations console.

The primary non-user interfaces to the computer system 110 are to device drivers and peripheral units. Administrative and security/backup related interfaces also can be supported. The main automated outputs are the video and the sound effect feeds, to the projection device and sound board respectively. Live sound is mixed with the audio feed at a separate sound desk, the audio feed being treated basically as an additional input. The audio feed can carry positional information to support the directional/spatial sound requirements. Other interfaces can include triggers to staging devices and pyrotechnics as desired and available, and support for additional sound and image inputs from other standalone devices (such as the real-time cartoon character device described earlier, other video sources or sound effect machines).

F. Example Scene

The following description outlines how a performance director would use virtual staging to manage a typical sequence of related events in a performance. In the example the action of the sequence as perceived by the audience is first described. Then, a screen appearing on a performance director console is described. Finally, the action is cross referenced to the details on the example screen, making specific reference to virtual staging controls.

1. Action Sequence

Three actors stand looking out over the river Styx, their backs to the audience with the river projected as an image behind them on the stage. One character plays Moses, who turns away from the river to face the audience and starts to assemble his staff in preparation for parting the waters. As he is so preoccupied, one of the other actors stoops down and appears to skim a flat stone out over the (projected image of the) river. Instead of skipping across the water as might be expected, the water mysteriously forms a sinister mouth and swallows the stone as it nears its surface. Moments later, unaware of what his fellow travellers have just observed, Moses turns back to the river and raises his staff. As he chants, the river is torn in two in front of the actors and audience.

Quickly the three travellers climb onto their bikes and start to pedal towards and seemingly into the channel that has opened up in the river. As they motion as if to pedal away from the audience and into the river, the perceived observation position of the projected image and related sound effects are changed, to create the impression that the audience is following behind the actors, into the watery channel. As the actors and audience "move" forward, the apparent source of sounds of the river are simultaneously moved backwards through the auditorium, embellishing the impression of motion across/through the river.

Part way across, the introductory music to a song starts. At this time the perceived angle of view of the projected image, directions of sounds and the acting surface itself are all rotated in coordination. The effect experienced by the audience is as if they have orbited 180 degrees around the actors, moving from a position following them, to one where they now look at them, pedalling towards the audience. With the actors now pedalling forwards at the audience and the image and sounds of the river passing off into the distance behind them, the actors sing the next song. By the conclusion of the song, they reach the far bank of the river, as the river channel closes behind them.

2. The Performance Director Console

The performance director manages the execution of the electronic script typically by triggering a coordinated sequence of control signals, and possibly adjusting the rate of execution of any one (combined) sequence. In both instances, the performance director progresses and adjusts the execution of the script in response to the live performance and/or the audience reaction. A console displays the various threads of activity in a visual format (e.g. actor's dialogue, musician's score, displayed video image or graphic engine coordinate controls, sound effects, lighting adjustments and physical stage movements). The electronic script maintains timing and synchronization links between these activities as necessary to maintain the virtual staging effect, while providing the performance director with the flexibility to pause, prompt, accelerate or slow down overall execution as may be needed to adjust to the spontaneity of any one performance.

Figure 3:
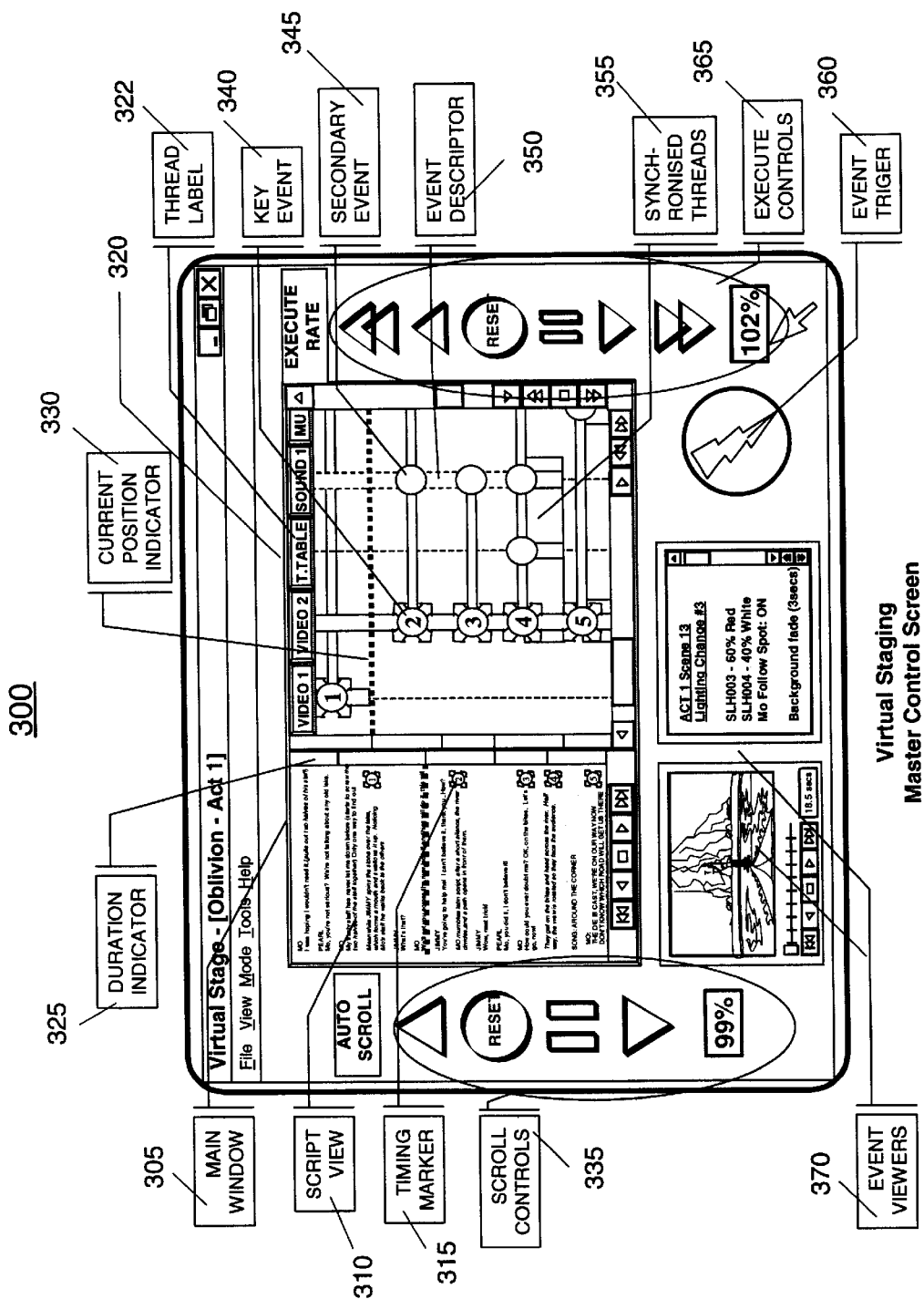
FIG. 3 is an illustration of a performance director console screen according to a preferred embodiment of the present invention.

FIG. 3 shows an exemplary screen 300 of a performance director console. Only the main controls are shown on this simplified version. On a fill scale screen many more threads and a longer sequence of activity would be visible in a main window 305. In addition, a more comprehensive and sophisticated array of editing and manipulative controls would be available. The purpose of FIG. 3 is to illustrate the nature of the on-line controls that will be available to the performance director to manage the performance. The main features of the screen 300 will next be described.

The main window 305 is the large area in the center of the screen and is in fact two separate windows, which can be independently scrolled/paged vertically and if appropriate horizontally, (as implied by the standard format control buttons shown). The left window of the main window 305 is a dialogue script view 310 and shows the dialogue script and lyrics, with markers 315 positioned within the dialogue as a visual reference/prompt for the performance director. The right window of the main window 305 is a thread view 320 and shows a selected combination of threads that the performance director uses to monitor and trigger the range of effects in synchronization with the performance. Thread labels, such as the thread label 322, at the top of the thread view 320 indicate the identity of each thread, which progress vertically downward. Time progresses vertically downwards on the thread view 320, corresponding to the script being read down the dialogue script view 310.

Between the dialogue script view 310 and thread view 320 are duration indicators 325. Each vertical block of the duration indicators 325 corresponds to a short time interval (e.g. 15 seconds), providing a rough guide as to the typical timing of a performance. The vertical blocks might be of different sizes as actors are unlikely to speak at a constant rate of words or lines per minute. The duration indicators 325 are merely a visual aid to enable the performance director to match the dialogue in the dialogue script view 310 to the events scheduled on the threads in the thread view 320, by providing a common vertical scale. An alternate screen format might use a standard time interval vertically, in which case the text in the script view 310 would need to be reformatted (e.g. variable line spacing) to match to it. A horizontal indicator, such as the current position indicator 330, shows the present point of the performance. In the example it can be seen that the performance director has scrolled the dialogue script view 310 down slightly, perhaps to look ahead at the dialogue.

The main window (both halves) scrolls down as determined by scroll controls 335. The system defaults to scrolling the window at a predetermined rate (based on a typical performance). The performance director can then adjust the default rate, speeding up, slowing down or pausing the scrolling in response to the specific performance. An alternative mode of display is to simply step the main window 305 forward as the performance director triggers specific events.

The performance director is able to dynamically select which threads are shown in the thread view 320. The thread view 320 window summarizes how threads (such as video sequences, lighting adjustments, sounds effects and stage hydraulic controls) are synchronized to the performance. An event in a thread could be the initiation of an action, such as starting a video sequence, or could be a state change, such as a lighting adjustment. An event is indicated as a circle on the vertical line of any visible thread. Key events marked with cross arrows, are events that when triggered, cause the automatic initiation of one or more other events in other threads. This synchronization is shown in the diagram with a dark connecting line between the key event and its triggered secondary events. For example, a key event marker 340 (labeled "2" in this case) is linked to the secondary event marker 345.

An event will typically have a duration, such as the playing time of a video sequence, or the time taken to rotate a stage turntable. The duration of an event is indicated by the vertical length of an event descriptor—the rectangular box extending below the circle event marker in the diagram—such as the event descriptor box 350. If an event descriptor box has a dotted outline, this shows that its duration is unbounded, i.e. it can continue indefinitely and need not be synchronized to any other activity, such as a background sound effect or a lighting configuration. Such an event would typically be terminated whenever the next event on that thread is triggered.

Where one or more events need to be executed in lock-step synchronization at a matched rate, this is indicated with a shaded background in the diagram, such as synchronization indicator 355. For example, the execution rates of video, sound and stage turntable position adjustments may need to be coordinated to achieve a suitable virtual staging effect as the auditorium is "rotated".

In typical operation, the performance director will initiate one key event after another, in time with the live performance, following the sequence in the electronic script, as shown pictorially on the screen 300. Some visual prompt may be provided, e.g. the next key event flashing on the screen, at which point the performance director can click on the event trigger button 360 at the exact time to match the live performance. Alternatively, key events can be triggered by the system automatically, in which case the performance director takes more of a passive role. The subsequent rate of execution of the threads can then be adjusted if necessary against the default rate using rate controls 365 to speed up, slow down, pause or reset to the default rate as necessary. The system responds, for example, by increasing the frame rate of a video sequence, rotating a stage turntable slightly faster, and increasing the beat rate for live musicians.

Two further pieces of information are available to the performance director. When clicking on an event marker, such as the key event marker 340, for example, a small window (not shown) opens with a brief narrative description of the event. For more detail, the performance director can point to the event descriptor box and then drag the cursor into one of two event viewer windows 370 (shown at the base of the screen 300). Depending on the nature of the event, additional details of the event are displayed, with a suitable selection of display controls. In the example shown, a video image with playback controls is shown on the left side of the event viewer 370, and some lighting adjustment descriptions are shown as a simple text box on the right side of the event viewer 370.

3. Interaction Between Action and Console

The stage action described above is also reflected in the information on screen 300 Numbers (1–5) shown in the key event markers correspond to specific points in the action as now described. Note that for the sake of this example, the video component is described as if it is generated using a three-dimensional real-time graphics engine. Using this technology, the virtual staging control framework provides apparent viewpoint position coordinates and motion controls to the engine to enable it to generate the correct perspective and position for the projected image. The same or similar effect could be achieved using pre-recorded video loops and sequences. In such an instance, instead of providing coordinate and motion instructions, the system would initiate pre-recorded video segments as necessary to match the performance. If using prerecorded video, loops would be required to project stationery scenes, and variable rate sequences for moving scenes.

Starting with the three characters standing on the river bank, the performance director monitors their dialogue, as the scene remains largely static, with distant sounds of the Underworld surrounding the audience, according to threads VIDEO 2 and SOUND 1. As Moses turns from the river, a second actor approaches a point on the stage, facing the video projection screen. The performance director triggers an animated sequence, which is overlaid on the projected image of the river, according to event no. 1 of the thread VIDEO 1. First, small enough to only be visible to the actor, a countdown sequence of numbers (4,3,2,1) is projected on the part of the screen where the actor is to pretend to cast the stone. As the video sequence progresses, the system issues lighting adjustment signals to a lighting rig to divert attention away from Moses to the other actor. (Note the lighting thread is not visible on the screen 300 as shown, though the link between it and the key event no. 1 of the thread VIDEO 1 is visible as a horizontal dark line.) At the exact time the actor swings his arm, a cartoon image of a stone flies out over the river, only to be gobbled up by the sinister face that forms in its surface.

In time with the completion of the animated sequence, the system then issues further lighting adjustments automatically, restoring the initial balance of lighting. (Again, the specific event on the lighting thread is not shown.) The actors work through further dialogue, as Moses prepares to part the waters and instructs the others to ready the bikes. The bikes are physical props, mounted on an automated rotating turntable set in the stage surface. As Moses moves to face the projected image of the river (facing away from the audience), the performance director prompts the video sequence of the parting of the water. In time with the video image, sounds and lighting changes are made, focussing attention on Moses and triggering suitable surround sound effects, such as rising thunder, according to the threads VIDEO 2 and SOUND 1 at event no. 2. In time with the dialogue, the video image shows the sky darkening as the river parts. Coordinated lighting adjustments and low frequency sound is broadcast into the auditorium in close synchronization with the image.

As the waters part, Moses turns back to the other actors, standing by the bikes. The performance director and actors wait, in case, as happens occasionally, the audience reacts with applause to the visual effect. Then the actors climb onto their bikes and get ready to start pedalling. The performance director triggers the next scheduled key event (key event no. 3), which starts a moving video sequence as the actors, with the audience in tow, appears to pedal into the channel in the river. This virtual effect of movement is enhanced as the directional capability of the sound system in the auditorium is used in synchronization with the video image to give the impression that the sources of various sounds are themselves moving backwards through the auditorium.

Part way into the river channel, the performance director then triggers an apparent 180 degree rotation of the virtual stage. Synchronized control signals are sent to the graphics engine which generates outputs to VIDEO 2, to the directional sound effects generator and to the rotating stage turntable, as shown at event no. 4. Also at this time, in response to a livelier than typical audience response, the performance director may decide to speed up their journey across the river, by making adjustments to the rate of executing the script, e.g., pressing the "up" arrow of the rate controls 365 to set the rate to 102%.

Once the actors have turned the full 180 degrees to now be facing the audience, the Performance director triggers the cue for the musicians at key event no. 5. Beat and cue information, reflecting the faster execution rate selected by the performance director earlier, is displayed on the monitors in front of the musicians (as might also be their musical score). The musicians start to play at the appropriate point and rhythm to match the next video sequence of passing through the channel towards the audience. The system ensures, that even though the performance director has sped up the execution, the rate of displaying the video sequence is matched to the adjusted rhythm of the song, such that at the end of the song, the actors reach the bank of the river as planned.

The preceding example is intended to be illustrative, not limiting, of the features of the present invention. Those skilled in the art will readily appreciate that different symbols, designs, and arrangements of information in the screen 300 are possible. Those skilled in the art will further realize that the various threads of activity, as well as the linkages between them, may be represented, expressed, stored, and signified in various forms, and that the same virtual staging scene may result from sets of threads that are organized or expressed differently. The terms and descriptions used herein are set forth by way of illustration only and are not meant as limitations. Those skilled in the art will recognize that numerous variations are possible within the spirit and scope of the invention as defined in the following claims and their equivalents.

What is claimed is:

1. A process comprising:

staging a performance that follows a schedule before a mass audience, the performance involving electronic and/or mechanical media that is computer controlled, wherein in the course of the performance an action not normal to the schedule can occur, and wherein adjustments are made to the timing of one or more electronic and/or mechanical media activities, whereby to compensate for the action not normal to the schedule.

2. The process of claim 1 further comprising:

experiencing an action not normal to the schedule.

3. The process of claim 2 wherein the adjustment comprises an adjustment to a speed of execution of the one or more electronic and/or mechanical media activities.

4. The process of claim 2 wherein the adjustment comprises an modification to a sequence of execution of the one or more electronic and/or mechanical media activities.

5. The process of claim 2 wherein the adjustment comprises an adjustment of a repetition count of the one or more electronic and/or mechanical media activities.

6. The process of claim 2 wherein the adjustment comprises execution of an electronic and/or mechanical media activity that had been previously unscheduled.

7. The process of claim 2 wherein the adjustment comprises a delay of execution of an electronic and/or mechanical media activity.

8. The process of claim 2 wherein the adjustment comprises an extension of an execution time of an electronic and/or mechanical media activity.

9. The process of claim 1 wherein the performance is live.

10. The process of claim 1 wherein the performance involves one or more performers and the staging step comprises:

performing by the one or more performers.

11. The process of claim 10 wherein the unscheduled action is an unscheduled action by the one or more performers.

12. The process of claim 1 wherein the unscheduled action is an action by the audience.

13. The process of claim 1 wherein the electronic and/or mechanical media comprises a video surface.

14. The process of claim 1 wherein the electronic and/or mechanical media comprises a sound system.

15. The process of claim 1 wherein the electronic and/or mechanical media comprises a lighting system.

16. The process of claim 1 wherein the electronic and/or mechanical media comprises a moveable platform.

17. A process comprising:

staging a live presentation that follows a schedule, the presentation involving electronic and/or mechanical media that is computer controlled so as to create a virtual reality of one or more events, wherein in the course of the performance an action not normal to the schedule can occur, and wherein adjustments are made to the timing of one or more electronic and/or mechanical media activities, whereby to compensate for the action not normal to the schedule.

18. The process of claim 17 further comprising:

experiencing an action not normal to the schedule.

19. The process of claim 18 wherein the adjustment comprises an adjustment of a speed of execution of the one or more electronic and/or mechanical media activities.

20. The process of claim 18 wherein the adjustment comprises a modification of a sequence of execution of the one or more electronic and/or mechanical media activities.

21. The process of claim 18 wherein the adjustment comprises an adjustment of a repetition count of the one or more electronic and/or mechanical media activities.

22. The process of claim 18 wherein the adjustment comprises execution of an electronic and/or mechanical media activity that had been previously unscheduled.

23. The process of claim 18 wherein the adjustment comprises a delay of execution of an electronic and/or mechanical media activity.

24. The process of claim 18 wherein the adjustment comprises an extension of an execution time of an electronic and/or mechanical media activity.

25. The process of claim 17 wherein the staging step comprises:

presenting the electronic and/or mechanical media before a mass audience.

26. The process of claim 25 wherein the unscheduled action is an action by the audience.

27. The process of claim 17 wherein the performance involves one or more persons and the staging step comprises:

presenting by the one or more persons.

28. The process of claim 27 wherein the unscheduled action is an unscheduled action by the one or more persons.

29. The process of claim 17 wherein the electronic and/or mechanical media comprises a video surface.

30. The process of claim 17 wherein the electronic and/or mechanical media comprises a sound system.

31. The process of claim 17 wherein the electronic and/or mechanical media comprises a lighting system.

32. The process of claim 17 wherein the electronic and/or mechanical media comprises a moveable stage platform.

33. An apparatus comprising:

at least one sensory stimuli device;

a mass audience area substantially within a space for reception of the at least one sensory stimuli device; and a computer system comprising:

a script of a performance;

a control program that steps through the script and allows adaptation of the performance in response to an action not normal to the schedule; and at least one control interface to the at least one sensory stimuli device, the control interface connected to the control program, whereby sensory stimuli associated with the performance can be commanded by the control program.

34. The apparatus of claim 33 wherein the computer system further comprises:

a timing framework connected to the control program.

35. The apparatus of claim 34 wherein the timing framework comprises at least one clock according to which the rate by which the control program steps through the script is determined.

36. The apparatus of claim 33 wherein the computer system further comprises:

a database connected to the script.

37. The apparatus of claim 36 wherein the database comprises video images.

38. The apparatus of claim 36 wherein the database comprises an audio signal.

39. The apparatus of claim 36 wherein the database comprises staging instructions.

40. The apparatus of claim 36 wherein the database comprises a musical score.

41. The apparatus of claim 33 wherein the script comprises at least one thread of activity.

42. The apparatus of claim 41 wherein the at least one thread comprises a musical score for an instrument.

43. The apparatus of claim 42 wherein the at least one thread comprises spoken lines.

44. The apparatus of claim 42 wherein the at least one thread comprises a sequence of video images.

45. The apparatus of claim 42 wherein the at least one thread comprises a sequence of lighting instructions.

46. The apparatus of claim 42 wherein the at least one thread comprises a sequence of sound effects.

47. The apparatus of claim 42 wherein the at least one thread comprises a sequence of one or more platform motions.

48. The apparatus of claim 33 wherein the computer system further comprises:

an audience interface connected to the computer system.

49. The apparatus of claim 33 further comprising:

a performing area, whereby live performers can perform on the performing area.

50. The apparatus of claim 49 wherein the performing area is a stage.

51. The apparatus of claim 49 wherein the performing area comprises a moveable platform.

52. The apparatus of claim 33 wherein the at least one sensory stimuli device comprises a video surface.

53. The apparatus of claim 52 wherein the video surface is one or more rear projection video surfaces.

54. The apparatus of claim 52 wherein the computer system further comprises a graphics engine.

55. The apparatus of claim 52 wherein the graphics engine is a real-time three-dimensional graphics engine.

56. The apparatus of claim 52 wherein the computer system further comprises a video framestore.

57. The apparatus of claim 52 further comprising:

one or more surfaces adjacent the video surface, wherein the surfaces have one or more qualities selected from the group consisting of the quality of being at least partially translucent, the quality of being textured, and the quality of being color illuminated.

58. The apparatus of claim 33 wherein the at least one sensory stimuli device comprises a sound system.

59. The apparatus of claim 58 wherein the sound system is a directional sound system.

60. The apparatus of claim 33 wherein the at least one sensory stimuli device comprises a lighting system.

61. The apparatus of claim 33 further comprising:

at least one console connected to the control program.

62. The apparatus of claim 61 wherein the at least one console comprises a performance director console, and the computer system further comprises at least one performance director interface, whereby a performance director may access the script and/or the control program.

63. The apparatus of claim 61 wherein the at least one console comprises a musician console.

64. The apparatus of claim 61 wherein the at least one console comprises an engineer console.

65. The apparatus of claim 61 wherein the at least one console comprises a performer console.

66. A process comprising:

staging a performance that follows a schedule before a mass audience, the performance involving electronic and/or mechanical media that is computer controlled, wherein in the course of the performance an action not normal to the schedule can occur, and wherein adjustments are made to the timing of a plurality of electronic and/or mechanical media activities, whereby to compensate for the action not normal to the schedule.

67. A process comprising:

staging a performance that follows a schedule before a mass audience, the performance involving electronic and/or mechanical media that is computer controlled, wherein in the course of the performance an action not normal to the schedule can occur, and wherein adjustments are made by a computer to the timing of a plurality of electronic and/or mechanical media activities, whereby to compensate for the action not normal to the schedule.

68. A process comprising:

staging a live presentation that follows a schedule, the presentation involving electronic and/or mechanical media that is computer controlled so as to create a virtual reality of one or more events, wherein in the course of the performance an action not normal to the schedule can occur, and wherein adjustments are made to the timing of a plurality of electronic and/or mechanical media activities, whereby to compensate for the action not normal to the schedule.

69. A process comprising:

staging a live presentation that follows a schedule, the presentation involving electronic and/or mechanical media that is computer controlled so as to create a virtual reality of one or more events, wherein in the course of the performance an action not normal to the schedule can occur, and wherein adjustments are made by a computer to the timing of one or more electronic and/or mechanical media activities, whereby to compensate for the action not normal to the schedule.

70. An apparatus comprising:

at least one sensory stimuli device;

a mass audience area substantially within a space for reception of the at least one sensory stimuli device; and a computer system comprising:

a script of a performance;

a control program that steps through the script and allows adaptation of the performance, by adjusting the timing of a plurality of electronic and/or mechanical media activities, in response to an action not normal to the schedule; and at least one control interface to the at least one sensory stimuli device, the control interface connected to the control program, whereby sensory stimuli associated with the performance can be commanded by the control program.

\* \* \* \* \*